US009669886B2

(12) United States Patent
Sidles

(10) Patent No.: US 9,669,886 B2
(45) Date of Patent: Jun. 6, 2017

(54) WEAR SENSING DEVICE FOR A CARRIER ROLLER

(71) Applicant: Caterpillar Inc., Peoria, IL (US)

(72) Inventor: Timothy Gibbs Sidles, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/611,631

(22) Filed: Feb. 2, 2015

(65) Prior Publication Data

US 2016/0221618 A1 Aug. 4, 2016

(51) Int. Cl.
| B62D 55/04 | (2006.01) |
| B62D 55/08 | (2006.01) |
| B62D 55/14 | (2006.01) |
| B62D 55/21 | (2006.01) |

(52) U.S. Cl.
CPC ............. B62D 55/08 (2013.01); B62D 55/14 (2013.01); B62D 55/21 (2013.01)

(58) Field of Classification Search
CPC ........ B62D 55/08; B62D 55/14; B62D 55/32; B62D 55/30; B62D 55/305
See application file for complete search history.

(56) References Cited

U.S. PATENT DOCUMENTS

| 3,887,244 A | 6/1975 | Haslett et al. |
| 5,358,064 A | 10/1994 | Oertley |
| 5,451,110 A * | 9/1995 | Gams, Jr. ............... B02C 2/06 116/208 |
| 6,354,678 B1 * | 3/2002 | Oertley ................ B62D 55/30 305/143 |
| 6,431,665 B1 * | 8/2002 | Banerjee ............... B62D 55/30 180/9.1 |
| 6,736,254 B1 | 5/2004 | Fortenbery et al. |
| 6,868,711 B2 | 3/2005 | Ebi |
| 7,172,257 B2 * | 2/2007 | Tamaru ................ B62D 55/30 305/125 |
| 7,292,918 B2 * | 11/2007 | Silvester ............. B60R 16/0232 701/33.4 |
| 8,180,533 B2 * | 5/2012 | Coers ..................... A01D 75/18 701/50 |
| 8,312,981 B2 | 11/2012 | Franz |
| 9,169,623 B2 * | 10/2015 | Rebinsky ............. B62D 55/08 |
| 2002/0128790 A1 * | 9/2002 | Woodmansee ......... B23P 6/002 702/81 |
| 2003/0209052 A1 * | 11/2003 | Ebi .......................... G01N 3/56 73/7 |

(Continued)

FOREIGN PATENT DOCUMENTS

DE 103 24 924 12/2004

*Primary Examiner* — Hau Phan
(74) *Attorney, Agent, or Firm* — Finnegan, Henderson, Farabow, Garrett & Dunner, LLP

(57) ABSTRACT

A wear sensing device is disclosed. The wear sensing device may be used in conjunction with a carrier roller assembly of a track assembly. The wear sensing device may have a wear sensor roller mounted to an axle of the carrier roller assembly. The sensor roller may be configured to contact a track pin assembly connected to one or more track links of the track assembly. The wear sensing device may further have a wear sensor mounted to the wear sensor roller and configured to generate a signal indicative of a wear parameter of the one or more track links.

20 Claims, 3 Drawing Sheets

(56) References Cited

U.S. PATENT DOCUMENTS

| | | | |
|---|---|---|---|
| 2009/0166158 A1* | 7/2009 | Stoiber | B65G 21/2009 198/805 |
| 2013/0082846 A1* | 4/2013 | McKinley | G07C 3/08 340/870.01 |
| 2013/0255354 A1* | 10/2013 | Hawkins | G01N 3/56 73/7 |
| 2014/0324301 A1 | 10/2014 | Rebinsky | |
| 2015/0066291 A1* | 3/2015 | Johannsen | B62D 55/32 701/34.4 |

* cited by examiner

WEAR SENSING DEVICE FOR A CARRIER ROLLER

TECHNICAL FIELD

The present disclosure is directed to a wear sensing device and, more particularly, to a wear sensing device for a carrier roller.

BACKGROUND

A mobile machine may be used to perform various types of work on different worksites, such as a construction site, a demolition site, a mining site, or a landfill site. For example, a bulldozer may be used to push soil and rock on a construction site. The bulldozer, as a track-type mobile machine, includes a tracked undercarriage with tracks on the left and right sides of the machine. Each of the tracks includes a chain formed by connecting a number of track links to one another, and connecting a number of track shoes to the chains. The tracks are supported by various roller assemblies on both sides of the machine.

Operation of the mobile machine inevitably results in wear or damage to various components, including components of the undercarriage such as the track links and the roller assemblies. For example, as a track assembly operates, a surface of each track link may wear away through contact with other components of the track assembly, machine, and/or outside materials (e.g., the ground). It is known to service or replace a track assembly component, for example, when the component exceeds its expected lifetime (based on the age of the component or number of hours of use experienced by the component), or based on the results of inspection or evaluation of the component.

In order to monitor an amount of wear experienced by a track assembly component more efficiently, various wear sensing devices have been developed. Some such wear sensing devices are mounted to track links to measure a change in size of the track link to estimate an amount of wear that has occurred. While this arrangement may allow for direct measurement of track link wear, it may suffer from the drawback that the wear sensing device, being located on the moving track, is exposed to a harsh environment as the track cycles through mud, water, ice, etc. Thus, the wear sensing device may be vulnerable to damage.

In another wear sensor configuration, such as the configuration disclosed in U.S. Patent Application Publication No. 2013/0255354 to Hawkins et al. ("the '354 publication"), a wear sensing device is mounted to a track roller assembly instead of the track itself. While the configuration of the '354 publication may help protect the wear sensing device from a harsh environment, it may be limited in its application. In particular, the configuration of the '354 publication allows only for wear measurement of a bearing of the track roller assembly. The wear sensing device is not configured, for example, to measure a change in size of a moving track component, such as a track link. Thus, there is a need for a wear sensing device that is both protected from the harsh environment of the track assembly and configured to measure wear of a component of the moveable track.

The present disclosure is directed to overcoming one or more of the problems set forth above and/or other problems of the prior art.

SUMMARY

In one aspect, the present disclosure is directed to a wear sensing device. The wear sensing device may be used in conjunction with a carrier roller assembly of a track assembly. The wear sensing device may include a wear sensor roller mounted to an axle of the carrier roller assembly. The sensor roller may be configured to contact a track pin assembly connected to one or more track links of the track assembly. The wear sensing device may further include a wear sensor mounted to the wear sensor roller and configured to generate a signal indicative of a wear parameter of the pair of track links.

In another aspect, the present disclosure is directed to carrier roller assembly for a track assembly. The carrier roller assembly may include an axle rotatably mounted to a vehicle frame, and a pair rollers mounted to the axle and configured to contact a pair of track links of the track assembly. The carrier roller assembly may also include a wear sensing device. The wear sensing device may include a wear sensor roller mounted to the axle between the pair rollers and configured to contact a track pin assembly connecting the pair of track links. The wear sensing device may further include a wear sensor mounted to the wear sensor roller and configured to generate a signal indicative of a wear parameter of the pair of track links.

In yet another aspect, a machine is disclosed. The machine may include a frame and a track assembly including a drive sprocket, a chain assembly, a traction assembly, an idler assembly, a lower roller assembly, and a carrier roller assembly, the track assembly configured to propel the machine. The chain assembly may include a pair of track links connected by a track pin assembly. The track pin assembly may include a pin and a bushing. The carrier roller assembly includes may include an axle rotatably mounted to the frame, and a pair of rollers mounted to the axle and configured to contact the pair of track links of the track assembly. The carrier roller assembly may also include a wear sensing device. The wear sensing device may include a wear sensor roller mounted to the axle between the pair of rollers and configured to contact the bushing. The wear sensing device may further include a wear sensor mounted to the wear sensor roller and configured to generate a signal indicative of a wear parameter of the pair of track links. The bushing may be formed from a material that is harder than the material from which the wear sensor roller is formed.

DETAILED DESCRIPTION

Figure 1:
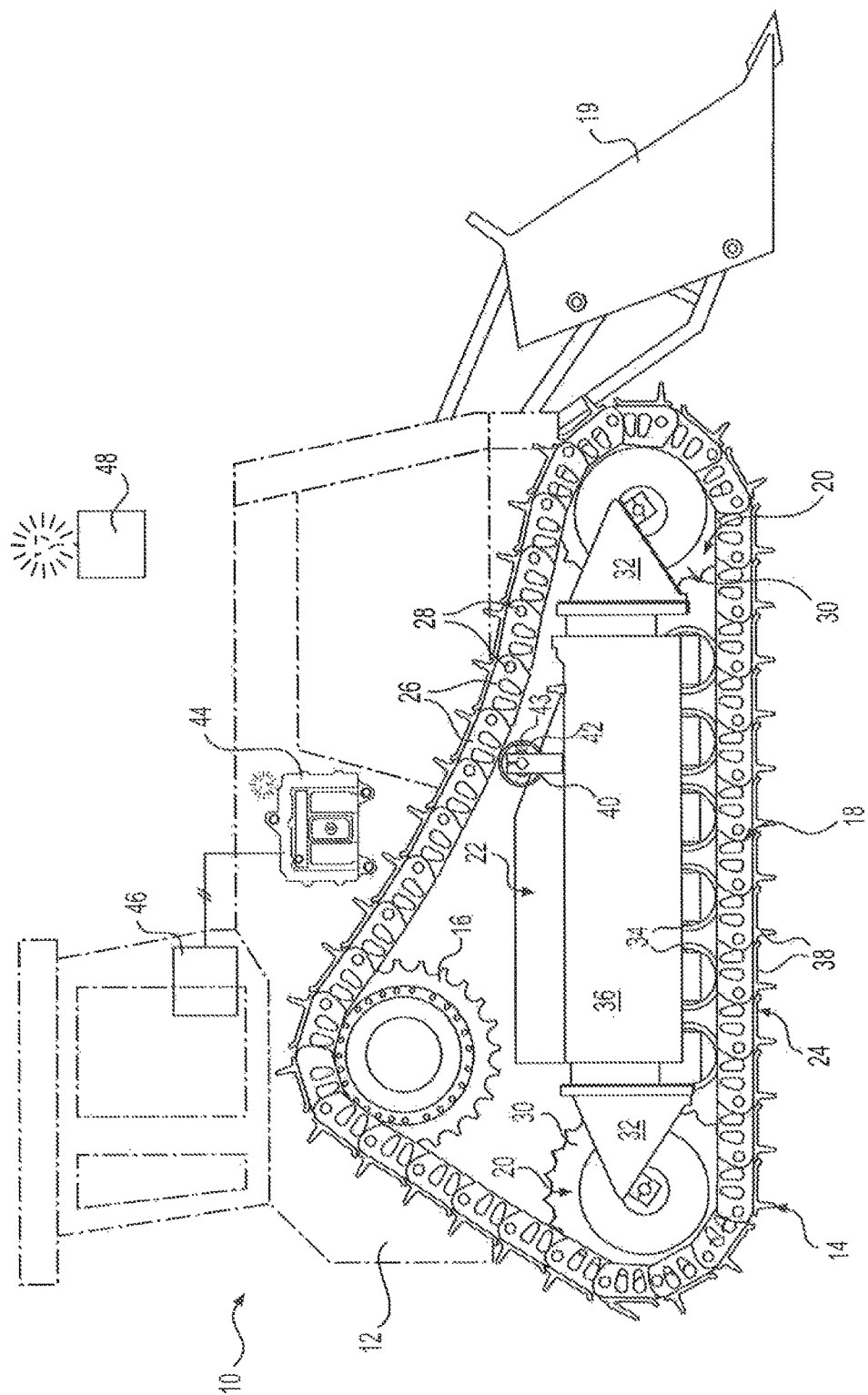
FIG. 1 illustrates an exemplary machine, consistent with disclosed embodiments.

FIG. 1 illustrates a machine 10, consistent with disclosed embodiments. The machine 10 may embody a track-type machine, such as any machine that is driven, propelled, positioned, and/or maneuvered by operating a "continuous" track-type traction device. Such machines may include, for example, track-type tractors, skid steers, dozers, excavators, backhoes, track loaders, front shovels, rope shovels, or any other type of track-maneuverable machine. The machine 10 may include a frame 12 and a pair of track assemblies 14 (only one shown) secured to the frame 12 on opposing sides of the machine 10. The track assembly 14 may include a drive sprocket 16 coupled to the driving mechanism (not shown), and a chain assembly 18 operatively coupled to the driving mechanism by the drive sprocket 16 and configured to propel the machine 10. The machine 10 may also include a work tool 19.

The driving mechanism may include one or more components configured to generate a torque output. For example, the driving mechanism may include any suitable type of internal combustion engine, such as a gasoline, diesel, natural gas, or hybrid-powered engine or turbine. Alternatively or additionally, the driving mechanism may embody an electric motor, electrically coupled to an electric power source and configured to convert at least a portion of the electrical energy from the electric power output into mechanical energy. According to yet another embodiment, the driving mechanism may include a hydraulic motor fluidly coupled to a hydraulic pump and configured to convert a fluid pressurized by the pump into a torque output.

The drive sprocket 16 may be coupled to the driving mechanism via a shaft, which may provide an interface for delivering torque generated by the driving mechanism to the drive sprocket 16. For example, the drive sprocket 16 may be secured (e.g., welded, bolted, heat-coupled, etc.) to a hub associated with a shaft, so that the drive sprocket 16 rotates in response to the torque generated by the driving mechanism. In some embodiments, the drive sprocket 16 may be directly coupled via a drive shaft to the driving mechanism. Alternatively, the drive sprocket 16 may be coupled to the driving mechanism via a torque converter (such as a gearbox, transmission, etc.), so that rotation of the drive sprocket 16 is proportional to the torque generated by the driving mechanism.

The track assembly 14 may include a plurality of components that form the "continuous" track, ground-engaging portion of the drive system of the machine 10. The track assembly 14 may include, among other things, the drive sprocket 16, the chain assembly 18, at least one idler assembly 20, a roller assembly 22, and a traction assembly 24. However, it should be understood that these components of the track assembly 14 are exemplary only and not intended to be limiting. Accordingly, the track assembly 14 may include additional and/or different components than those listed above.

The chain assembly 18 may form a continuous chain connected around outer portions of the drive sprocket 16, the idler assemblies 20, and the roller assembly 22. The traction assembly 24 may be connected to an outer portion of the chain assembly 18 and configured to engage a ground surface beneath the machine 10. In use, rotation of the drive sprocket 16 may cause the chain assembly 18 to move around the drive sprocket 16, the idler assemblies 20, and the roller assembly 22, causing the traction assembly 24 to engage the ground and thereby propel machine 10 in a manner known in the art.

In an exemplary embodiment, the chain assembly 18 may include a plurality of interconnected track links 26. It should be understood that "track link," as used herein, refers to any linkage component of a continuous chain for a track-type machine, and is not limited to track links 26 described herein. In one embodiment, adjacent (e.g., consecutive) track links 26 may be coupled via a plurality of track pin assemblies 28. In an exemplary embodiment, the chain assembly 18 may include two parallel sets of track links, connected to each other by the track pin assemblies 28 in a manner known in the art.

The idler assemblies 20 may include components configured to guide the chain assembly 18 as it moves around the track assembly 14. For example, each of the idler assemblies 20 may include an idler 30 and a mount 32. The idlers 30 may include features configured to engage the chain assembly 18. For example, the idlers 30 may include engagement surfaces configured to contact and guide the track links 26 as they pass around the idler 30. In some embodiments (such as the idler 30 shown in FIG. 1), the idler 30 may include idler teeth (e.g., between the engagement surfaces) configured to engage the track pin assemblies 28. In other embodiments, the engagement surfaces may be separated by a flange. The mounts 32 may hold each of the idlers 30 in place on the machine 10 through connection to the frame 12.

The roller assembly 22 may also include components configured to guide the chain assembly 18. For example, the roller assembly 22 may include a plurality a lower roller assemblies 36 and a carrier roller assembly 40. The lower roller assembly 36 may include a roller frame mounted to the frame 12 of the machine 10. The lower roller assembly 36 may include a plurality of lower rollers 34 configured to guide the chain assembly 18 at a lower side of the roller frame. The lower rollers 34 may each be suspended from the roller frame. For example, each of the lower rollers 34 may be rotationally supported on an axle suspended below the roller frame. The lower rollers 34 may ride on and guide the track links 26 as they pass under the roller frame.

The carrier roller assembly 40 may include one or more rollers 42. The one or more rollers 42 may be rotatably mounted to the frame 12. For example, the roller(s) 42 may be mounted to an upper portion of the roller frame to which the lower rollers 34 are mounted. The roller(s) 42 may guide the chain assembly 18 at an upper side of the roller frame. The carrier roller assembly 40 may be positioned between the drive sprocket 16 and the far idler 30 to "carry" the chain assembly 18 at a location that helps to prevent the chain assembly 18 from sagging.

The traction assembly 24 may include a plurality of track shoes 38 carried by the chain assembly 18. In some embodiments, the track shoes 38 may be separate from the chain assembly 18 and include a connecting portion configured to be secured to one or more of the track links 26 and a ground-engaging portion configured to contact the ground. In other embodiments, individual track shoes 38 and track links 26 may be integrally formed as one piece. The ground-engaging portion of the track shoes 38 may include one or more features (e.g., grouser bars) that provide increased traction between the track shoes 38 and the ground. It should be understood, however, that the disclosed embodiments may be used with any type of track shoe forming a part of a track assembly used by a track-type mobile machine. In other embodiments, the track shoes 38 may be omitted entirely from the track assembly 14, so that surfaces of the track links 26 that would otherwise contact the track shoes 38 may contact the ground surface under the machine 10.

The work tool 19 may include any device used to perform a particular task. For example, the work tool 19 may include a bucket, a plow, a blade, or another task-performing device known in the art. The work tool 19 may include a ground-engaging member, such as an edge protector, tooth member, etc. The ground-engaging member may be configured to contact the ground (or other working material) during performance of a task, and may be replaceable, such as for when the ground-engaging member is worn.

In an exemplary embodiment, the machine 10 may include one or more components of a detection system configured to monitor a parameter of the track assembly 14. For example, the machine 10 may include at least one sensing device 43 and a controller 44. The sensing device 43 may be an electronic device configured to detect a parameter associated with use of the machine 10 and transmit a signal indicative of the parameter to the controller 44. The controller 44 may be configured to forward information received from the sensing device 43 to another device, such as an on-board computer 46 or off-board computer 48. In this way, information associated with a parameter of the machine 10 may be automatically determined and routed to an appropriate destination (e.g., for display to an operator).

In an exemplary embodiment, the detection system may be configured to monitor a wear parameter. For example, the sensing device 43 may be configured to measure a parameter associated with an amount of wear experienced by a component of the machine 10 and transmit a signal indicative of the amount of wear to the controller 44. As used herein, a "wear parameter" is a measurement or other characteristic of a monitored component or the sensing device 43 that may indicate an amount of wear experienced by the monitored component (when compared to a previous measurement or other previous characteristic, for example) and/or an amount of expected life remaining.

In an exemplary embodiment, the sensing device 43 may be mounted in, on, or around a component of the machine 10 and configured to detect a wear parameter thereof. For example, the sensing device 43 may be configured to detect a wear parameter associated with wear of at least one surface of a body of a component of machine 10. In an exemplary embodiment, the sensing device 43 may be mounted to carrier roller assembly 40.

The controller 44 may include one or more computing devices, such as a one or more microprocessors. For example, the controller 44 may embody a general microprocessor capable of controlling numerous machine functions, including wear monitoring. The controller 44 may also include all of the components required to run an application such as, for example, a computer-readable memory, a secondary storage device, and a processor, such as a central processing unit. Various other known circuits may be associated with the controller 44, including power source and other appropriate circuitry. In addition, the controller 44 may include communication hardware and/or software configured to perform one or more processes to allow the controller 44 to communicate (e.g., wirelessly or through a wired connection) with the sensing device 43 and at least one of the on-board computer 46 and the off-board computer 48.

The on-board computer 46 may be a computing device located on the machine 10 (e.g., inside the operator cabin). For example, the on-board computer 46 may be a dashboard computer including at least a processor and a display. The on-board computer 46 may communicate with the controller 44 (e.g., via a wired or wireless connection) to receive wear parameter information. The on-board computer 46 may display wear parameter information (e.g., to an operator of the machine 10).

The off-board computer 48 may be a similar computing device located away from the machine 10 (e.g., inside a control building). The off-board computer 48 may also include at least a processor and a display. The off-board computer 48 may be configured to communicate with the controller 44 and/or the on-board computer 46 (e.g., via a wireless network) to similarly receive wear parameter information, which may be displayed to an operator (e.g., a machine supervisor) away from the machine 10.

Figure 2:
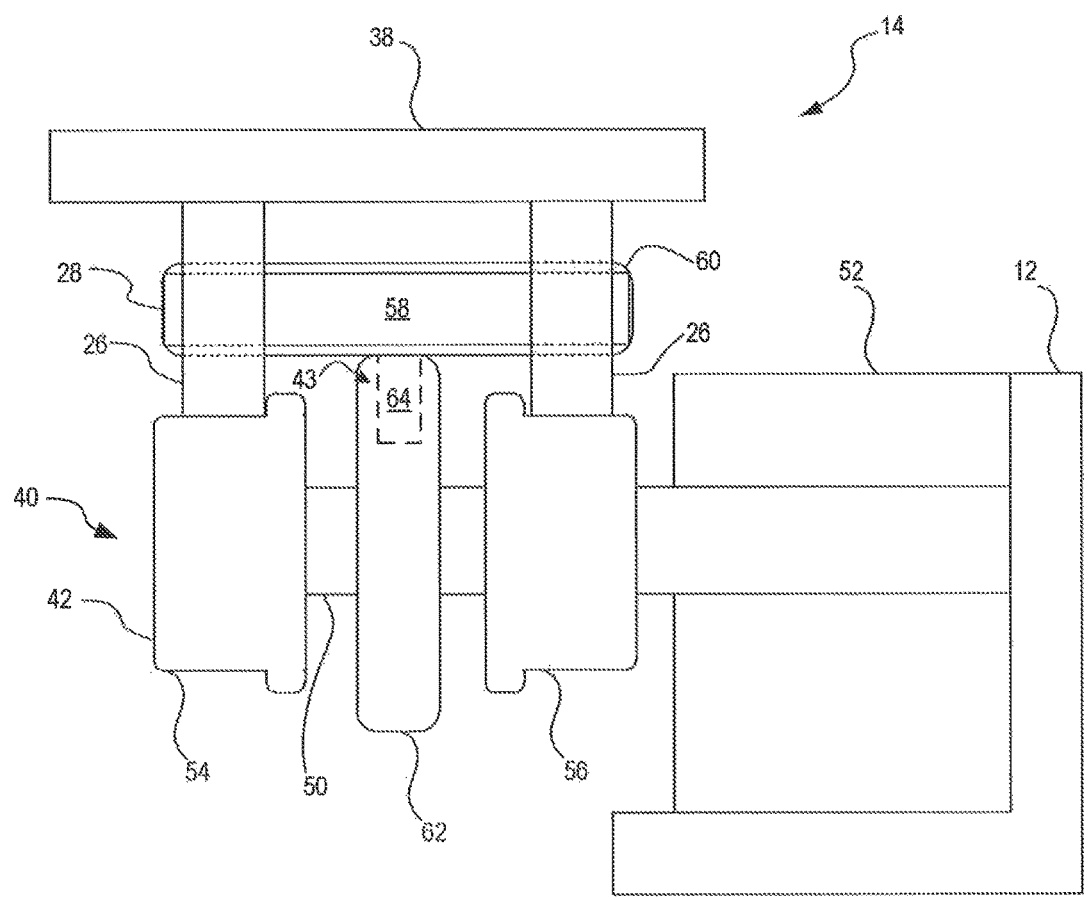
FIG. 2 illustrates a cross-sectional view of a carrier roller assembly that may be used in conjunction with the machine of FIG. 1.

FIG. 2 illustrates a cross-sectional view of the carrier roller assembly 40. The carrier roller assembly 40 may include the one or more rollers 42 mounted on an axle 50. The axle 50 may be rotatably connected to the frame 12, either directly or indirectly, such as through a carrier roller mount 52. In an exemplary embodiment, the one or more rollers 42 may include a pair of rollers 54, 56. The pair of rollers 54, 56 may be positioned on the axle 50 to contact a pair of track links 26 of the chain assembly 18. In this way, the pair of rollers 54, 56 may support the chain assembly 18 as it passes over the carrier roller assembly 40. While the pair of rollers 54, 56 are shown, it should be understood that the one or more rollers 42 may include any number of rollers mounted to the axle 50.

As the track assembly 14 operates, chain assembly 18 travels over the carrier roller assembly 40, and different pairs of track links 26 (and corresponding track shoes 38) sequentially pass over and are supported by the pair of rollers 54, 56. As shown in FIG. 2, one of the track pin assemblies 28 connects the pair of track links 26 and holds the pair of track links 26 at a distance corresponding to the pair of rollers 54, 56. While pairs of track links 26 are shown in FIG. 2, it should be understood that the track pin assemblies 28 may be connected to any number of track links 26, including between two sides of one track link 26 (which may also be considered a "pair of track links") and two or more track links. In an exemplary embodiment, the track pin assembly 28 includes a pin 58 and a bushing 60 surrounding the pin 58. It should be understood, however, that the pin 58 and the bushing 60 may be one component.

As described above, the carrier roller assembly 40 may include the wear sensing device 43. The wear sensing device 43 may include components configured to measure a wear parameter associated with chain assembly 18. In an exemplary embodiment, wear sensing device 43 may include a wear sensor roller 62 and a wear sensor 64. The wear sensor roller 62 may be a cylindrical component mounted to the axle 50. As shown in FIG. 2, the wear sensor roller 62 may be mounted adjacent to one or more of the rollers 54, 56, such as between the pair of rollers 54, 56. In this way, the wear sensor roller 62 may be positioned beneath the track pin assemblies 28 as they pass over the carrier roller assembly 40. In an exemplary embodiment, the carrier roller assembly 40 may be sized and configured to contact the bushing 60 of the track pin assembly 28.

The wear sensor 64 may be a component configured to generate a signal indicative of a wear parameter of the track assembly 14. In an exemplary embodiment, the wear sensor 64 may be configured to generate a signal indicative of an amount of wear experienced by the track links 26. For example, the wear sensor 64 may be configured to measure a parameter (e.g., distance) associated with a position of the bushing 60, as the position of the bushing 60 changes as track links 26 wear (e.g., as a height of track links 26 reduces, the bushing 60 will move closer to the axle 50).

In an exemplary embodiment, the wear sensor 64 may include at least a sensor component, a processing device, a power source, and a communication device. The manner in which the wear sensor 64 detects a wear parameter may depend on the configuration of the sensor component. It should be understood that the wear sensor 64 is not limited to the configurations described herein, and may include other configurations that allow the wear sensor 64 to detect a wear parameter.

The sensor component of the wear sensor 64 may be any sensor configured to measure and/or detect a wear parameter associated with track assembly 14. In an exemplary embodiment, the sensor component may a wear member configured to wear away with the wear sensor roller 62. For example, the sensor component may include one or more wire loops configured to break when a corresponding amount of wear occurs, although other configurations are possible. In another example, the sensor component may be another type of sensor configured to measure a wear parameter, such as a distance between the sensor and an interface of the wear sensor roller 62 and the bushing 60 (e.g., a surface of the wear sensor roller 62). For instance, the sensor component may be one or more of a hall effect sensor, ultrasonic sensor, magnetic sensor, induction sensor, or laser sensor.

In either configuration, the wear sensor 64 may be configured to generate a signal indicative of an amount of wear experienced by the wear sensor roller 62 based on the wear of the wear sensor 64, which may be determined based on the wear experienced by the wear sensor 64 or the a distance from the wear sensor 64 to contact surface of the wear sensor roller 62. The amount of wear of the wear sensor roller 62 may be correlated to the amount of wear of track links 26.

The processing device may be configured to generate, receive, transmit, and/or modify a signal indicative of a wear parameter detected by the sensor component. For example, the processing device may include a signal conditioner, an amplifier, a multiplexer, and/or a converter (e.g., an analog-to-digital (VD) converter or a digital-to-analog (D/A) converter). In some embodiments, the processing device may also include a controller, such as a low-power microcontroller, that may provide an output in response to the input received from the sensor component and/or one or more signals processed by any or all of the other processing devices. The processing device may further include a memory device, such as either or both of a random-access memory (RAM) and a read-only memory (ROM), which may store information related to operation of the wear sensor 64. Alternatively or additionally, the memory device may store instructions used by one or more other components of the wear sensor 64, such as the processing device.

The power source may provide power to one or more of the components of the wear sensor 64. In one embodiment, power source may include a battery, such as a coin-cell type battery. In some embodiments, the power source may additionally or alternatively include a motion-based energy source, such as a vibration-based energy-harvesting system, to power one or more of the components of the wear sensor 64, and/or may be used to charge a battery of the power source. In yet another embodiment, the power source may include a battery capable of being wirelessly charged (e.g., near field charging). In this way, the wear sensor 64 may be embedded within the wear sensor roller 62 while being capable of receiving electrical power from outside of the wear sensor roller 62, and thus reducing on-board power (e.g., battery) requirements.

In one embodiment, the communication device may be a transceiver, such as for example a radio-frequency (RF) transceiver, which may wirelessly broadcast the output provided by the processing device (e.g., to the controller 44). Alternatively or additionally, an output port (not shown), such as for example a USB (universal serial bus) port or similar port, may transmit the output provided by the processing device through a cable or other connection removably connected to the output port.

Figure 3:
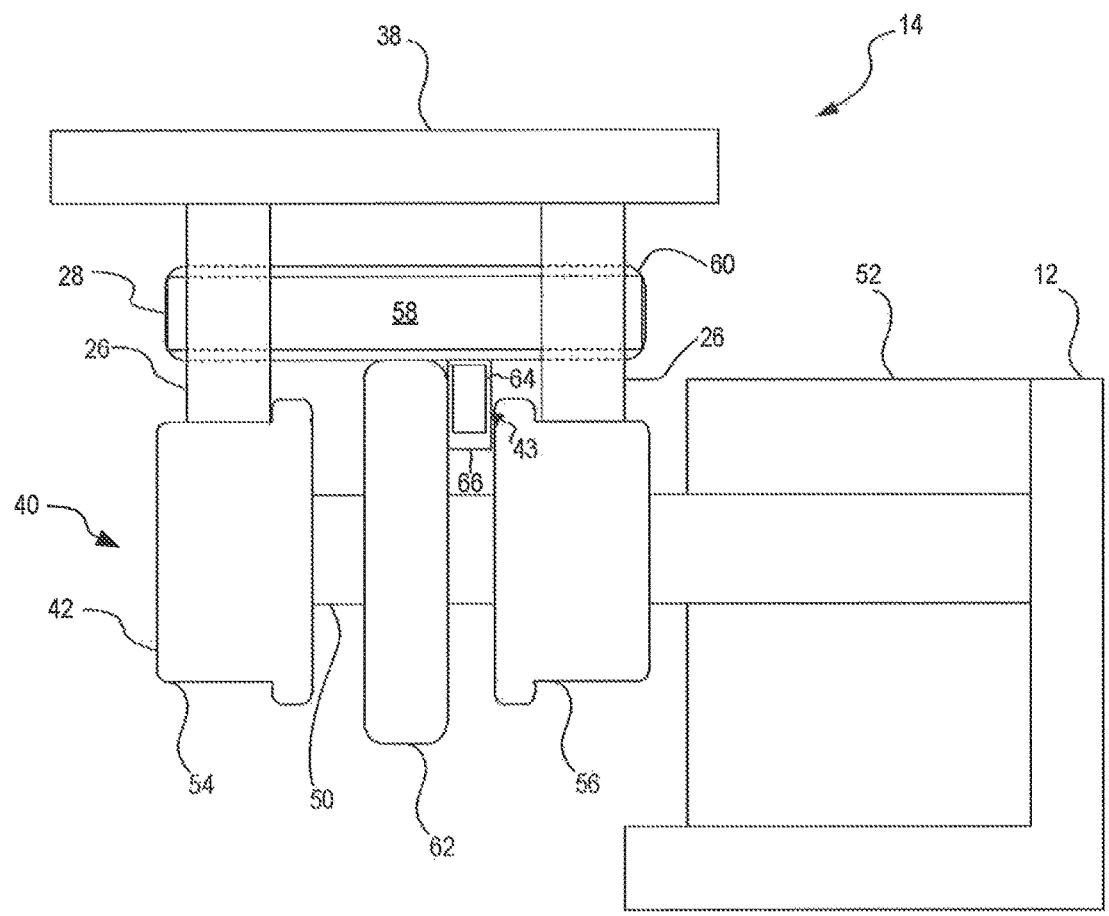
FIG. 3 illustrates another cross-sectional view of another carrier roller assembly that may be used in conjunction with the machine of FIG. 1.

As shown in the embodiment of FIG. 2, the wear sensor 64 may be embedded in the body of the wear sensor roller 62. In this way, the wear sensor 64 is at least protected from damage. FIG. 3 depicts an alternative embodiment in which the wear sensor 64 is mounted to an outer surface of the wear sensor roller 62. In some embodiments, the wear sensor 64 may be positioned inside a housing 66 that is mounted to the outer surface of the wear sensor roller 62. The housing 66 may provide protection while allowing for easy access to the wear sensor 64. It should be understood that other configurations are possible.

INDUSTRIAL APPLICABILITY

The exemplary disclosed wear sensing device may be applicable to detecting wear of a component of a track assembly. The wear sensing device may be particularly applicable to detecting wear associated with a track roller, such as a carrier roller assembly. The use of the wear sensing device in conjunction with a carrier roller assembly provides advantages of efficiency and protection. For example, locating the wear sensor within the confines of the rollers helps protect the wear sensor from the environment by surrounding the wear sensor, as well as positioning the wear sensor above the ground at all times. In addition, the exemplary embodiments allow for measurement of wear associated with a moving track component, such as a the track links.

In order to use the wear sensing device 43, the wear sensor 64 may be first mounted to the wear sensor roller 62. For example, the wear sensor 64 may be embedded in a cavity in the wear sensor roller 62 or mounted to an outer surface of the wear sensor roller 62 (e.g., inside housing 66). The wear sensor roller 62 may be positioned on the axle 50, between the pair of rollers 54, 56.

In use, chain assembly 18 may pass over carrier roller assembly 40, causing wear at the interface of contacting surfaces. For example, as the track link pairs 26 pass over the pair of rollers 54, 56, the track links 26 and the pair of rollers 54, 56 may begin to wear away at their respective contact surfaces. Meanwhile, wear sensor roller 62 may engage the bushings 60 as they pass over the carrier roller assembly 40, causing the wear sensor roller 62 to wear. As this wear occurs, the track links 26 and track pin assemblies 28 will move closer to the axle 50.

In order to determine how much wear has occurred, the wear sensor 64 may determine an amount of wear experienced by the wear sensor roller 62. For example, in the embodiment in which the wear sensor 64 wears away with the wear sensor roller 62, wear sensor 64 may determine a number of wire loops that have broken and determine an amount of corresponding wear. In other embodiments, the wear sensor 64 may use the hall effect, ultrasonic waves, magnets, induction, lasers, or the like, to measure a distance from the wear sensor 64 to the wear surface of the wear sensor roller 62. The measured amount may be compared to a previous amount to determine a change in size experienced by the wear sensor roller 62, which may be due to wear.

The wear sensor 64 may, continuously or on-demand, generate signals indicative of the amount of wear experienced by the wear sensor roller 62. Wear sensor 64 may transmit these signals to controller 44, which may determine an amount of wear experienced by the track links 26 based on the amount of wear experienced by the wear sensor roller 62. The wear sensor 64 may transmit a corresponding signal to the on-board computer 46 and/or the off-board computer 48. It should be understood that the wear sensor 64, the on-board computer 46, and/or the off board computer 48 may alternatively determine an amount of wear experienced by the track links 26 based on the amount wear detected by the wear sensor 64. The on-board computer 46 and/or the off-board computer 48 may receive (and/or determine) the wear information and perform one or more processes to inform an operator of the wear parameter, automatically schedule maintenance, update tracked wear information, estimate a remaining part life, etc.

Through the exemplary disclosed processes, the sensing device 43 may provide automatic and/or on-demand monitoring of a wear parameter associated with a component (e.g., the track link 26, the roller(s) 42, etc.), including components of the moving chain assembly 18. In addition, the configuration of the sensing device 43, including positioning the wear sensor 64 between the pair of rollers 54, 56, allows the wear sensing device 43 to provide efficient and accurate wear parameter measurements while being well above the ground (and out of the environmental elements such as mud and ice), and protected by the other components of the carrier roller assembly 40 (e.g., the pair of rollers 54, 56).

It will be apparent to those skilled in the art that various modifications and variations can be made to the wear sensing device of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A wear sensing device for a carrier roller assembly of a track assembly, the wear sensing device comprising:
    a wear sensor roller mounted to an axle of the carrier roller assembly,
        the sensor roller configured to contact a track pin assembly connected to one or more track links of the track assembly; and
    a wear sensor mounted to the wear sensor roller and configured to generate a signal indicative of a wear parameter of the one or more track links.

2. The wear sensing device of claim 1, wherein the carrier roller assembly includes one or more rollers mounted to the axle and is configured to contact the pair of track links, and
    wherein the wear sensor roller is mounted adjacent to the one or more rollers.

3. The wear sensing device of claim 1, wherein the track pin assembly includes a pin and a bushing, and
    wherein the wear sensor roller is configured to contact the bushing.

4. The wear sensing device of claim 3, wherein the bushing is formed from a material that is harder than a material from which the wear sensor roller is formed.

5. The wear sensing device of claim 1, wherein the wear sensor is embedded in the wear sensor roller.

6. The wear sensing device of claim 5, wherein the wear sensor is configured to wear away with the wear sensor roller, and
    wherein the signal is indicative of an amount of wear experienced by the wear sensor.

7. The wear sensing device of claim 6, wherein the wear sensor includes a plurality of wire loops configured to break when a corresponding amount of wear occurs.

8. The wear sensing device of claim 5, wherein the wear sensor is at least one of a hall effect sensor, an ultrasonic sensor, a magnetic sensor, an induction sensor, or a laser sensor.

9. The wear sensing device of claim 1, wherein the wear sensor is mounted to an outer surface of the wear sensor roller.

10. The wear sensing device of claim 9, further including a wear sensor housing mounted to the outer surface of the wear sensor roller and housing the wear sensor, and
    wherein the housing is configured to contact the track pin assembly.

11. A carrier roller assembly for a track assembly, the carrier roller assembly comprising:
    an axle rotatably mounted to a vehicle frame;
    a pair of rollers mounted to the axle and configured to contact a pair of track links of the track assembly; and
    a wear sensing device, comprising:
        a wear sensor roller mounted to the axle between the pair of rollers and configured to contact a track pin assembly connecting the pair of track links; and
        a wear sensor mounted to the wear sensor roller and configured to generate a signal indicative of a wear parameter of the pair of track links.

12. The carrier roller assembly of claim 11, wherein the track pin assembly includes a pin and a bushing, and
    wherein the wear sensor roller is configured to contact the bushing.

13. The carrier roller assembly of claim 12, wherein the bushing is formed from a material that is harder than a material from which the wear sensor roller is formed.

14. The carrier roller assembly of claim 11, wherein the wear sensor is embedded in the wear sensor roller.

15. The carrier roller assembly of claim 14, wherein the wear sensor is configured to wear away with the wear sensor roller, and
    wherein the signal is indicative of an amount of wear experienced by the wear sensor.

16. The carrier roller assembly of claim 15, wherein the wear sensor includes a plurality of wire loops configured to break when a corresponding amount of wear occurs.

17. The carrier roller assembly of claim 14, wherein the wear sensor is one of a hall effect sensor, ultrasonic sensor, magnetic sensor, induction sensor, or laser sensor.

18. The carrier roller assembly of claim 11, wherein the wear sensor is mounted to an outer surface of the wear sensor roller.

19. The carrier roller assembly of claim 18, further including a wear sensor housing mounted to the outer surface of the wear sensor roller and housing the wear sensor, and
    wherein the housing is configured to contact the track pin assembly.

20. A machine including:
    a frame;
    a track assembly including a drive sprocket, a chain assembly, a traction assembly, an idler assembly, a track roller assembly, and a carrier roller assembly,
        the track assembly configured to propel the machine;
        wherein the chain assembly includes a pair of track links connected by a track pin assembly,
            the track pin assembly including a pin and a bushing, and
        wherein the carrier roller assembly includes:
            an axle rotatably mounted to the frame;
            a pair of rollers mounted to the axle and configured to contact the pair of track links of the track assembly; and
    a wear sensing device, comprising:
        a wear sensor roller mounted to the axle between the pair of rollers and configured to contact the bushing; and
        a wear sensor mounted to the wear sensor roller and configured to generate a signal indicative of a wear parameter of the pair of track links,
            wherein the bushing is formed from a material that is harder than a material from which the wear sensor roller is formed.

* * * * *